UNITED STATES PATENT OFFICE.

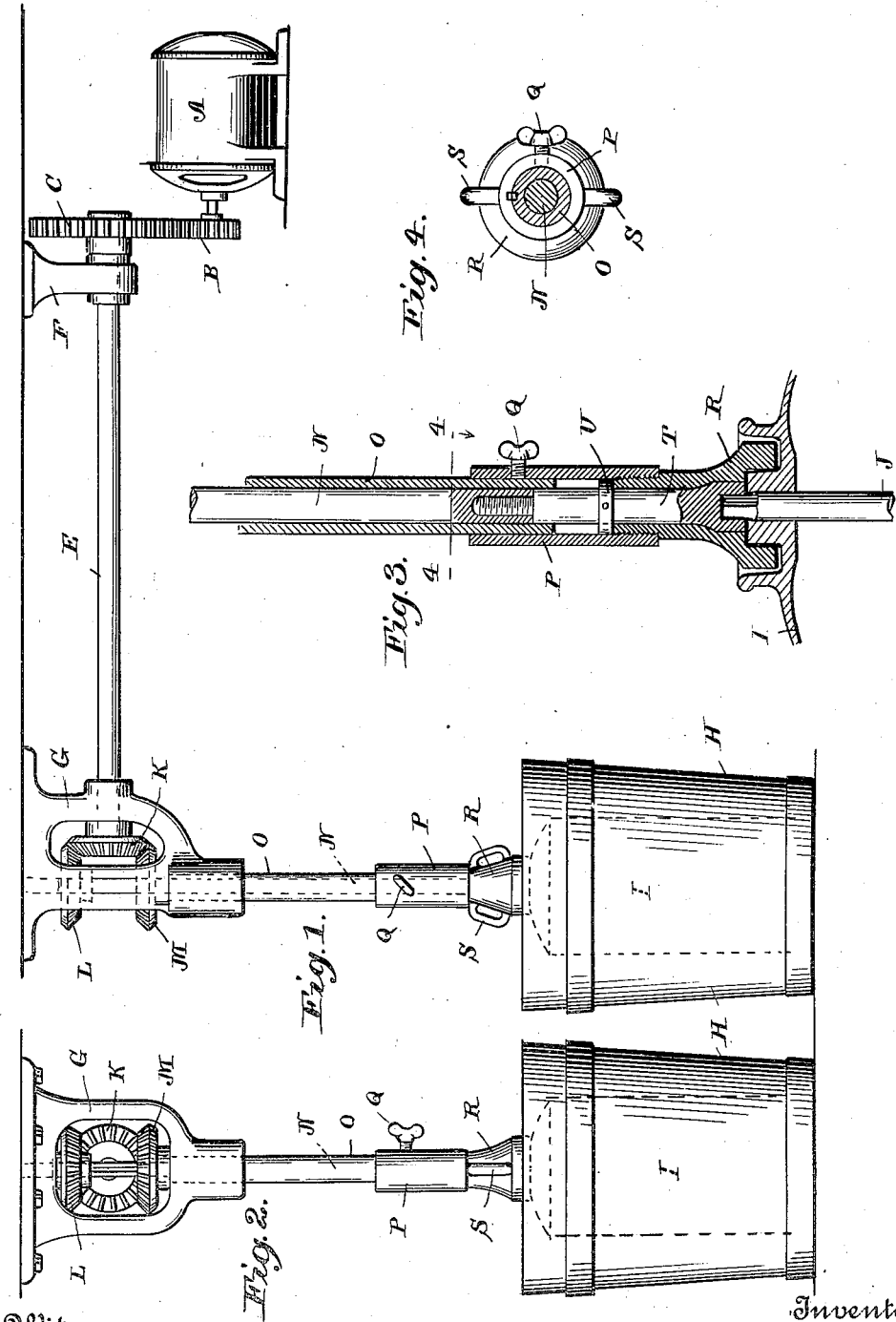

ALBERT F. SCHMAND, OF BRIDGEPORT, CONNECTICUT.

ICE-CREAM FREEZER.

No. 845,667.   Specification of Letters Patent.   Patented Feb. 26, 1907.

Application filed February 17, 1906. Serial No. 301,552.

*To all whom it may concern:*

Be it known that I, ALBERT F. SCHMAND, a citizen of the United States, and a resident of Bridgeport, in the county of Fairfield and State of Connecticut, have invented certain new and useful Improvements in Ice-Cream Freezers, of which the following is a specification.

This invention relates to new and useful improvements in ice-cream freezers such as are operated by power, and refers more particularly to mechanism for operating the freezer proper.

It is the object of my invention to produce a freezer which is convenient and durable and especially well adapted for manufacturers' or confectioners' use; to design the apparatus in such a manner that the driving machinery will be located out of reach of the flying salt and ice thrown from the freezer when in operation; to make the device attachable to an overhead or line shaft such as are commonly found in ice-cream-freezing establishments, and, finally, to construct the apparatus in a simple and inexpensive manner, so as to permit of it being cheaply manufactured and sold.

With the above and other minor objects in view my invention resides and consists in the novel construction and combination of parts shown upon the accompanying drawings, forming a part of this specification, upon which similar characters of reference denote like or corresponding parts throughout the several figures, and of which—

Figure 1 shows a side elevation of my complete apparatus, including a freezer-tub and electric motor for driving the apparatus. Fig. 2 is an end view of the device shown in Fig. 1. Fig. 3 shows upon an enlarged scale a central vertical section through my novel mechanism for connection with the freezer, and Fig. 4 is a sectional plan view taken on line 4 4 of Fig. 3.

Referring in detail to the characters of reference marked upon the drawings, A indicates an electric motor, which can be driven through any suitable connections. (Not shown.)

B and C represent gears operatively connecting the motor with the line-shaft E, journaled in hangers F and G, the latter being of special design to better accommodate the several parts and conditions.

H represents the ice-tub, and I a cream-can within the tub, which contains any preferred style of internal rotary paddle J, designed to be operated in a direction opposite to that of the can through my novel mechanism and by the power of the motor.

Upon the shaft E and within the hanger G is secured a bevel-gear K, which meshes with and drives similar bevel-gears L and M, one upon the central shaft N and the other upon the outer hollow shaft O. The upper gear L is obviously driven in one direction, while the lower gear M upon the hollow shaft is operated in the opposite direction. Said upper gear is loosely keyed to its shaft in a way to permit the said shaft to be raised and lowered therethrough, while the lower gear is rigidly secured to its shaft. In practice all of the foregoing mechanism, including the gears, would be supported from the ceiling of the room, with only the vertical shafts and attached parts depending in line with and for attachment to the freezer-can. Upon the lower end of the outer shaft is a sleeve P, which is adjustably attached to said shaft and secured in place by means of a set-screw Q. This sleeve is internally threaded for attachment to the end of the coupling R, that connects with the shouldered top of the cream-can. This coupling is provided with side handles S, by means of which the said coupling, togehter with the inner shaft, may be raised and disconnected from the cream-can and paddle. The set-screw may be used both for holding the coupling up when not in use as well as for holding it down when in operation. The threaded connection of the coupling with the holder permits the latter to be readily removed and attached for repairs. To the lower end of the inner shaft N is secured a smaller coupling T, that is threaded and detachably connected to the said shaft in a manner to also permit of repairs or replacement. This coupling obviously connects with the paddle-spindle and rotates the same within the cream-can and in an opposite direction from said can. This inner coupling T has a collar U attached thereto, which normally rests upon the end of the outer coupling, as shown in Fig. 3, in a manner to insure said inner coupling and shaft being raised and adjusted with the adjustment of the outer coupling—as, for instance, when placing a can in position preparatory to freezing the cream. It will of course be apparent that in the adjustment of these two couplings the inner shaft is raised throughout its entire length, sliding through the upper gear L, while the outer coupling and its sleeve is adjusted upon the outer shaft, which is fixed to the lower gear. These driving connections being located above the tub and in line with the axis of rotation of the cream-can, it is impossible for the ice and salt from the tub to be thrown upon it during the operation of the parts.

My apparatus can obviously be used for other purposes than that of freezing cream—as, for instance, in beating up icings and candies, such as marshmallows—and therefore I do not wish to be limited in its use or in such slight modifications of construction as might be desirable to better adapt it to such uses.

Having thus described my invention, what I claim, and desire to secure by Letters Patent, is—

1. In an ice-cream-freezing apparatus of the class described, the combination of a rotary hollow shaft, a second shaft within said hollow shaft adapted to be rotated in an opposite direction from the outer shaft and adjusted longitudinally, a sleeve adjustably mounted upon the outer shaft with means for securing it in adjusted positions, a coupling attached to said sleeve, a coupling detachably connected to the inner shaft, and a collar upon the said coupling to be engaged by the outer coupling to insure the raising of the inner shaft with the outer coupling.

2. In an apparatus of the class described, the combination with a driving mechanism including a pair of oppositely-driven bevel-gears, a paddle-shaft slidably connected with one gear, a coupling detachably connected to said shaft, a hollow shaft secured to the second gear, a sleeve adjustably mounted upon the hollow shaft, and a coupling secured to the sleeve, and a collar upon the inner shaft to engage the end of the coupling whereby the inner coupling and shaft may be raised with the outer coupling.

Signed at Bridgeport, in the county of Fairfield and State of Connecticut, this 14th day of February, A. D. 1906.

ALBERT F. SCHMAND.

Witnesses:
C. M. NEWMAN,
RUTH RAYMOND.